United States Patent
Kim et al.

(10) Patent No.: US 11,987,667 B1
(45) Date of Patent: May 21, 2024

(54) HIGH-VISCOSITY BIODEGRADABLE ALIPHATIC-AROMATIC POLYESTER COPOLYMER HAVING EXCELLENT HYDROLYSIS RESISTANCE AND METHOD OF PREPARING THE SAME

(71) Applicants: SK Innovation Co., Ltd., Seoul (KR); SK Geo Centric Co., Ltd., Seoul (KR); Kolon Industries, Inc., Seoul (KR)

(72) Inventors: Do Young Kim, Daejeon (KR); Hyun Sik Yang, Seoul (KR); Yu Hyun Kim, Seoul (KR); Ki Yup Kim, Daejeon (KR); Joo Hyun Nam, Daejeon (KR); Chul Soon Moon, Daejeon (KR); Ji Hae Park, Daejeon (KR); Sung Won Lee, Daejeon (KR); Jun Haeng Lee, Daejeon (KR); Ho Seung Lee, Daejeon (KR)

(73) Assignees: SK Innovation Co., Ltd., Seoul (KR); SK Geo Centric Co., Ltd., Seoul (KR)

( * ) Notice: Subject to any disclaimer, the term of this patent is extended or adjusted under 35 U.S.C. 154(b) by 0 days.

(21) Appl. No.: 18/448,370

(22) Filed: Aug. 11, 2023

(30) Foreign Application Priority Data

Nov. 30, 2022 (KR) .......................... 10-2022-0164742

(51) Int. Cl.
 *C08G 63/52* (2006.01)
 *C08G 63/183* (2006.01)
 *C08G 63/78* (2006.01)
(52) U.S. Cl.
 CPC ........... *C08G 63/183* (2013.01); *C08G 63/52* (2013.01); *C08G 63/785* (2013.01); *C08G 2230/00* (2013.01)

(58) Field of Classification Search
 USPC ................................................. 528/271, 272
 See application file for complete search history.

(56) References Cited

FOREIGN PATENT DOCUMENTS

| | | | |
|---|---|---|---|
| JP | 2020511565 A | 4/2020 | |
| KR | 101789724 B1 | 10/2017 | |
| KR | 102420447 B1 | 7/2022 | |
| WO | WO-2014027736 A1 * | 2/2014 | ........... C08G 63/181 |

OTHER PUBLICATIONS

WO-2014027736-A1 machine translation (Year: 2014).*

* cited by examiner

*Primary Examiner* — Terressa Boykin
(74) *Attorney, Agent, or Firm* — The Webb Law Firm

(57) ABSTRACT

Provided are a biodegradable aliphatic-aromatic polyester copolymer having excellent hydrolysis resistance and high viscosity which has a carboxyl end group (CEG) content of 15 mg KOH/g or less, a ratio (Mz/Mn) of a z-average molecular weight (Mz) to a number average molecular weight (Mn) of 3 to 15, and a melt index (MI) of 5 g/10 min or less as measured under conditions of a temperature of 190° C. and a load of 2.16 kg in accordance with ASTM D 1238. A method of preparing a biodegradable aliphatic-aromatic polyester copolymer is provided, including adding a chain extender and an anti-hydrolysis agent to an aliphatic-aromatic polyester pre-copolymer over time, whereby a significant viscosity rise and improvement of hydrolysis resistance may be implemented simultaneously.

19 Claims, No Drawings

HIGH-VISCOSITY BIODEGRADABLE ALIPHATIC-AROMATIC POLYESTER COPOLYMER HAVING EXCELLENT HYDROLYSIS RESISTANCE AND METHOD OF PREPARING THE SAME

CROSS-REFERENCE TO RELATED APPLICATION

This application claims priority to Korean Patent Application No. 10-2022-0164742 filed Nov. 30, 2022, the disclosure of which is hereby incorporated by reference in its entirety.

BACKGROUND OF THE INVENTION

Field of the Invention

The following disclosure relates to a biodegradable aliphatic-aromatic polyester copolymer having excellent hydrolysis resistance and high viscosity, and a method of preparing the same.

Description of Related Art

In order to solve an environmental pollution problem caused by indiscreet use of plastics, a method of replacing the plastics with biodegradable polymers which are decomposed under certain conditions is being suggested as a solution, and research and development therefor are actively progressing. In general, a biodegradable polymer may include a polyester, as an example, polybutylene adipate (PBA), polybutylene adipate terephthalate (PBAT), polybutylene succinate (PBS), polycaprolactone (PCL), and the like.

As plastic decomposes by exposure to sunlight and heat, the plastic waste releases greenhouse gases such as methane and ethylene. Incineration of plastic waste releases significant amounts of greenhouse gases (GHG), such as carbon dioxide, nitrous oxide and/or methane, into the environment. Carbon dioxide is the primary greenhouse gas contributing to climate change. Therefore, it is desirable to replace non-biodegradable plastics with biodegradable polymers which are decomposed under certain conditions to reduce waste and/or ameliorate the release of greenhouse gases into the environment by decomposition and/or incineration of packaging material.

The polyester may be prepared using a dicarboxylic acid compound and a diol compound as raw materials. Specifically, in order to prepare a polyester, a batch, semi-continuous, continuous method, or the like is used, and depending on the method described above, a condensation reaction may be performed for a sufficiently long time in order to prepare a high-viscosity polyester having a high molecular weight. However, the polyester is rather decomposed under condensation reaction conditions of a long time and a high temperature, so that the viscosity is lowered or an acid value is rapidly increased.

Thus, in order to prepare a polyester having high viscosity while minimizing a condensation reaction time under a high temperature condition, research using a specific additive such as a chain extender is in progress, but there is still a difficulty in satisfying both a high viscosity and a low acid value.

Therefore, research and development of a method of preparing a polyester having both a high viscosity and a low acid value even by a simple process are needed.

SUMMARY OF THE INVENTION

An embodiment of the present disclosure is directed to providing a method of preparing a biodegradable aliphatic-aromatic polyester copolymer having a viscosity and a low acid value in a short time from a low-viscosity aliphatic-aromatic polyester pre-copolymer, and a biodegradable aliphatic-aromatic polyester copolymer prepared therefrom.

Another embodiment of the present disclosure is directed to providing a biodegradable aliphatic-aromatic polyester copolymer which has a carboxyl end group (CEG) content of 15 mg KOH/g or less, a ratio (Mz/Mn) of a z-average molecular weight (Mz) to a number average molecular weight (Mn) of 3 to 15, and a melt index (MI) of 5 g/10 min or less as measured under conditions of a temperature of 190° C. and a load of 2.16 kg in accordance with ASTM D 1238.

The present inventors continuously studied in order to prepare a polyester having a high viscosity and a low acid value from a low-viscosity aliphatic-aromatic polyester pre-copolymer even by a simple process, and as a result, found that when a chain extender and an anti-hydrolysis agent are added over time, viscosity and hydrolysis resistance, which are in conflict, may be improved in a complementary manner, and thus, completed the present disclosure.

In one general aspect, a method of preparing a biodegradable aliphatic-aromatic polyester copolymer comprises: (S1) adding an aliphatic-aromatic polyester pre-copolymer to a reactor; (S2) adding a chain extender to the reactor to prepare a chain extended aliphatic-aromatic polyester pre-copolymer by a first polyaddition reaction of the aliphatic-aromatic polyester pre-copolymer and the chain extender; and (S3) adding an anti-hydrolysis agent to the reactor to perform a second reaction of the chain extended aliphatic-aromatic polyester pre-copolymer and the anti-hydrolysis agent.

According to an embodiment, the first reaction of (S2) may be performed at 150 to 250° C.

According to an embodiment, the first reaction of (S2) may be performed for 10 to 30 minutes.

According to an embodiment, the second reaction of (S3) may be performed at 180 to 280° C.

According to an embodiment, the second reaction of (S3) may be performed for 2 to 15 minutes.

According to an embodiment, a ratio of a second reaction time of (S3) to a first reaction time of (S2) may satisfy 0.1 to 0.5.

According to an embodiment, the chain extender may comprise or be a diisocyanate compound.

According to an embodiment, the chain extender may be comprised at 0.1 to 1 part by weight with respect to 100 parts by weight of the aliphatic-aromatic polyester pre-copolymer.

According to an embodiment, the anti-hydrolysis agent may comprise or be a carbodiimide compound.

According to an embodiment, the anti-hydrolysis agent may be comprised at 0.01 to 0.5 parts by weight with respect to 100 parts by weight of the aliphatic-aromatic polyester pre-copolymer.

According to an embodiment, a weight ratio of the anti-hydrolysis agent to the chain extender may satisfy 0.1 to 1.

According to an embodiment, the aliphatic-aromatic polyester pre-copolymer may have a melt index (MI) of 20 g/10 min or more as measured under conditions of a temperature of 190° C. and a load of 2.16 kg in accordance with ASTM D 1238.

According to an embodiment, a ratio (Mz/Mz$_i$) of a z-average molecular weight of the biodegradable aliphatic-aromatic polyester copolymer (Mz) to the z-average molecular weight aliphatic-aromatic polyester pre-copolymer (Mzi) may be 1.5 to 3.5.

In another general aspect, a biodegradable aliphatic-aromatic polyester copolymer prepared according to the method of preparing a biodegradable aliphatic-aromatic polyester copolymer described above is provided.

In still another general aspect, a biodegradable aliphatic-aromatic polyester copolymer which has a carboxyl end group (CEG) content of 15 mg KOH/g or less, a ratio (Mz/Mn) of a z-average molecular weight (Mz) to a number average molecular weight (Mn) of 3 to 15, and a melt index (MI) of 5 g/10 min or less as measured under conditions of a temperature of 190° C. and a load of 2.16 kg in accordance with ASTM D 1238 is provided.

According to an embodiment, the biodegradable aliphatic-aromatic polyester copolymer may have a weight average molecular weight (Mw) of 120,000 g/mol to 250,000 g/mol.

According to an embodiment, the biodegradable aliphatic-aromatic polyester copolymer may have a z-average molecular weight of 250,000 g/mol to 900,000 g/mol.

According to an embodiment, the biodegradable aliphatic-aromatic polyester copolymer may have a ratio (Mz/Mw) of the z-average molecular weight (Mz) to the weight average molecular weight (Mw) of 2 to 7.

According to an embodiment, the biodegradable aliphatic-aromatic polyester copolymer may be one or a combination of two or more selected from the group consisting of polybutylene adipate terephthalate (PBAT), polybutylene succinate butylene terephthalate (PBAST), polybutylene sebacate terephthalate (PBSeT), and the like, and mixtures thereof.

According to an embodiment, a method is provided herein for reducing greenhouse gas emissions by preparing a biodegradable aliphatic-aromatic polyester copolymer, the method comprising: (S1) adding an aliphatic-aromatic polyester pre-copolymer to a reactor; (S2) adding a chain extender to the reactor to prepare a chain extended aliphatic-aromatic polyester pre-copolymer by a first polyaddition reaction of the aliphatic-aromatic polyester pre-copolymer and the chain extender; and (S3) adding an anti-hydrolysis agent to the reactor to perform a second reaction of the chain extended aliphatic-aromatic polyester pre-copolymer and the anti-hydrolysis agent to produce a biodegradable aliphatic-aromatic polyester copolymer.

Other features and aspects will be apparent from the following detailed description, the drawings, and the claims.

DESCRIPTION OF THE INVENTION

Hereinafter, the present disclosure will be described in more detail. However, the following examples or exemplary embodiments are only a reference for describing the present disclosure in detail, and the present disclosure is not limited thereto and may be implemented in various forms.

In addition, unless otherwise defined, all technical terms and scientific terms have the same meanings as those commonly understood by one of those skilled in the art to which the present disclosure pertains.

The terms used for description in the present specification are only for effectively describing a certain specific exemplary embodiment, and are not intended to limit the present disclosure.

In addition, the singular form used in the specification and claims appended thereto may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, unless explicitly described to the contrary, a part "comprising" a constituent element will be understood to imply further inclusion of other constituent elements rather than the exclusion of any other constituent elements.

In addition, the numerical range used in the present specification may include all values within the range including the lower limit and the upper limit, increments logically derived in a form and span in a defined range, all double limited values, and all possible combinations of the upper limit and the lower limit in the numerical range defined in different forms. Unless otherwise particularly defined in the present specification, values which may be outside a numerical range due to experimental error or rounding off of a value are also included in the defined numerical range.

Hereinafter, the present disclosure will be described in more detail.

The present disclosure provides a method of preparing a biodegradable aliphatic-aromatic polyester copolymer comprising: (S1) adding an aliphatic-aromatic polyester pre-copolymer to a reactor; (S2) adding a chain extender to the reactor to prepare a chain extended aliphatic-aromatic polyester pre-copolymer by a first polyaddition reaction of the aliphatic-aromatic polyester pre-copolymer and the chain extender; and (S3) adding an anti-hydrolysis agent to the reactor to perform a second reaction of the chain extended aliphatic-aromatic polyester pre-copolymer and the anti-hydrolysis agent.

According to an embodiment, (S2) is a step of preparing a chain extended aliphatic-aromatic polyester pre-copolymer by a first reaction of an aliphatic-aromatic polyester pre-copolymer and a chain extender.

According to an exemplary embodiment, the first reaction may be a polyaddition reaction, and its reaction temperature may be 130 to 280° C., or 150 to 250° C., or 180 to 230° C. In addition, a reaction time of the first reaction (first reaction time) may be 5 to 60 minutes, specifically 10 to 30 minutes, and more specifically 10 to 20 minutes or 15 to 20 minutes.

According to an embodiment, the chain extender may comprise or be a diisocyanate compound. The diisocyanate compound may be an aromatic diisocyanate compound, an aliphatic diisocyanate compound, or a mixture thereof.

The aliphatic diisocyanate may be any one or a combination of two or more selected from tri, tetra-, penta-, hexa-, hepta-, or octa-methylene diisocyanate, 2-methylpentamethylene 1,5-diisocyanate, 2-ethyltetra methylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanate-3,3,5-trimethyl-5-isocyanate methylcyclohexane (isophorone diisocyanate, IPDI), 1,4- or 1,3-vis(isocyanate methyl) cyclohexane (HXDI), cyclohexane 1,4-diisocyanate, 1-methylcyclohexane 2,4- or 2,6-diisocyanate, methylene dicyclohexyl (4,4'-, 2,4'-, or 2,2'-)diisocyanate ($H_{12}$MDI), and/or the like, and mixtures thereof, but is not limited thereto.

In addition, the aromatic diisocyanate may be any one or a combination of two or more selected from naphthylene 1,5-diisocyanate (NDI), tolylene 2,4- or 2,6-diisocyanate (TDI), 3,3'-dimethyl-4,4'-diisocyanatediphenyl (TODI), p-phenylenediisocyanate (PDI), diphenylethane 4,4'-diisocyanate (EDI), diphenylmethane diisocyanate, dimethyldipheny13,3'-diisocyanate, diphenylethane 1,2-diisocyanate, diphenylmethane diisocyanate (MDI), and/or the like, and mixtures thereof, but is not limited thereto.

According to an embodiment, the chain extender may be comprised at 0.01 to 2 parts by weight, or 0.1 to 1 part by weight, or 0.2 to 0.7 parts by weight, or 0.2 to 0.5 parts by weight, with respect to 100 parts by weight of the aliphatic-aromatic polyester pre-copolymer. When the range is satisfied, a biodegradable aliphatic-aromatic polyester copolymer having a higher viscosity and excellent hydrolysis resistance may be prepared.

According to an embodiment, (S3) is a step of preparing a biodegradable aliphatic-aromatic polyester copolymer having high viscosity and excellent hydrolysis resistance by a second reaction of the chain extended aliphatic-aromatic polyester pre-copolymer and an anti-hydrolysis agent.

According to an embodiment, a reaction temperature of the second reaction (second reaction temperature) may be 150 to 300° C., or 180 to 280° C., or 200 to 250° C. In addition, a reaction time of the second reaction (second reaction time) may be 1 to 30 minutes, or 2 to 15 minutes, or 3 to 10 minutes.

According to an embodiment, a ratio of the second reaction time of (S3) to the first reaction time of (S2) may satisfy 0.01 to 5, or less than 1, or 0.1 to 0.5, or 0.1 to 0.4. When the range is satisfied, a biodegradable aliphatic-aromatic polyester copolymer having a higher viscosity and excellent hydrolysis resistance may be prepared.

According to an embodiment, the anti-hydrolysis agent may comprise or be a carbodiimide compound. The carbodiimide compound may comprise or be an aliphatic carbodiimide-based, an alicyclic carbodiimide-based, an aromatic carbodiimide-based, or a diisocyanate compound-derived polycarbodiimide or a mixture thereof, but is not limited thereto. Herein, a specific example of the diisocyanate compound may be the same as or different from the above description. Specifically, the carbodiimide compound may have a carbodiimide equivalent (molecular weight/number of carbodiimide groups) of 10 to 1000, or 50 to 70, or 100 to 500.

According to a preferred embodiment, the anti-hydrolysis agent may comprise or be a polycarbodiimide, or an aliphatic polycarbodiimide. The polycarbodiimide may have a number average molecular weight (Mn) of 500 to 10,000 g/mol, or 1,000 to 8,000 g/mol, or 1,500 to 5,000 g/mol. The polycarbodiimide may have a carbodiimide equivalent of 100 to 1000, or 150 to 500. The polycarbodiimide may have a softening point of 30 to 120° C., or 50 to 100° C., or 50 to 100° C. In addition, the polycarbodiimide may have a decomposition temperature of 200 to 500° C., or 300 to 500° C., or 320 to 400° C. The carbodiimide compound may be a compound prepared by a common synthesis method or a known method, or a commercially available product without major limitations.

According to an embodiment, the anti-hydrolysis agent may be included at 0.01 to 1 part by weight, or 0.01 to 0.5 parts by weight, or 0.1 to 0.3 parts by weight, with respect to 100 parts by weight of the aliphatic-aromatic polyester pre-copolymer. When the range is satisfied, a biodegradable aliphatic-aromatic polyester copolymer having a higher viscosity and excellent hydrolysis resistance may be prepared.

According to an embodiment, a weight ratio of the anti-hydrolysis agent to the chain extender may satisfy 0.01 to 2, or 0.1 to 1.5 or 0.1 to 1, or 0.3 to 0.8.

According to an embodiment, in (S1), the aliphatic-aromatic polyester pre-copolymer may be a polymer prepared by a common or known polymerization method of a polyester, from a polymerizable composition including a dicarboxylic acid compound comprising an aliphatic dicarboxylic acid and/or aromatic dicarboxylic acid and an aliphatic diol, and furthermore, may be prepared by selecting a known polymerization method such as continuous or batch polymerization method without limitation, or may be a commercially available polyester product without major limitations.

According to an embodiment, the aliphatic dicarboxylic acid may be a $C_{2-40}$ aliphatic dicarboxylic acid, or the aliphatic dicarboxylic acid may be a $C_{2-20}$ aliphatic dicarboxylic acid, and as an example, one or a combination of two or more selected from the group consisting of oxalic acid, malonic acid, succinic acid, glutaric acid, adipic acid, pimelic acid, sebacic acid, fumaric acid, azelaic acid, itaconic acid, 1,9-nonanedicarboxylic acid, 1,10-decanedicarboxylic acid, dimeric fatty acids, their anhydride derivatives, and/or the like, and mixtures thereof, or may be succinic acid, adipic acid, sebacic acid, or a mixture thereof.

According to an embodiment, the aromatic dicarboxylic acid may comprise or be a $C_{6-50}$ aromatic dicarboxylic acid, or a $C_{6-30}$ aromatic dicarboxylic acid, and as an example, may be one or a combination of two or more selected from the group consisting of phthalic acid, isophthalic acid, terephthalic acid, dimethyl phthalate, diethyl phthalate, dimethyl isophthalate, diethyl isophthalate, dimethyl terephthalate, diethyl terephthalate, and/or the like, and mixtures thereof.

In addition, in the dicarboxylic acid compound, the aliphatic dicarboxylic acid to the aromatic dicarboxylic acid may satisfy a mole ratio of 1 to 9:9 to 1, or 3 to 7:7 to 3, but is not limited thereto.

According to an embodiment, the aliphatic diol may comprise or be a $C_{2-20}$ aliphatic diol, or a $C_{2-15}$ aliphatic diol, and as an example, may be one or a combination of two or more selected from the group consisting of ethylene glycol, propylene glycol, neopentyl glycol, 1,3-propanediol, 1,4-butanediol, 1,5-pentanediol, 1,6-hexanediol, 1,2-octanediol, 1,6-octanediol, 1,9-nonanediol, 1,2-decanediol, 1,10-decanediol, and/or the like, and mixtures thereof, or may be one or a combination of two or more selected from the group consisting of ethylene glycol, propylene glycol, 1,3-propanediol, 1,4-butanediol, 1,6-hexanediol, and/or the like, and mixtures thereof.

In addition, the aliphatic diol to the dicarboxylic acid compound may satisfy a mole ratio of 1 to 3:1, or 1.2 to 2.5:1.

According to an embodiment, the aliphatic-aromatic polyester pre-copolymer may have a number average molecular weight (Mn) of 100,000 g/mol or less, or 80,000 g/mol or less, or 20,000 to 55,000 g/mol.

According to an embodiment, the aliphatic-aromatic polyester pre-copolymer may have a weight average molecular weight (Mw) of 200,000 g/mol or less, or 40,000 to 180,000 g/mol, or 70,000 to 160,000 g/mol.

According to an embodiment, the aliphatic-aromatic polyester pre-copolymer may have a z-average molecular weight (Mz) of 500,000 g/mol or less, or 50,000 to 500,000 g/mol, or 100,000 to 400,000 g/mol.

According to an embodiment, the aliphatic-aromatic polyester pre-copolymer may have a polydispersity index (PDI, Mw/Mn) of 1 to 5, or 1 to 4, or 1 to 3.5, but is not limited thereto.

According to an embodiment, the aliphatic-aromatic polyester pre-copolymer may comprise or be a polymer prepared from the polymerizable composition described above, or a commercially available polyester polymer. Specifically, the aliphatic-aromatic polyester pre-copolymer may comprise or be one or a combination of two or more selected from the group consisting of polybutylene adipate terephthalate (PBAT), polybutylene succinate butylene terephthalate (PBAST), polybutylene sebacate terephthalate (PBSeT), and/or the like, and mixtures thereof.

According to an embodiment, the aliphatic-aromatic polyester pre-copolymer may be a polymer having a low viscosity of a melt index (MI) of 15 g/10 min or more, or 20 g/10 min or more, or 20 to 50 g/10 min, as measured under conditions of a temperature of 190° C. and a load of 2.16 kg in accordance with ASTM D 1238.

According to an embodiment, a ratio ($MI_i$/MI) of the melt index (MTh of the aliphatic-aromatic polyester pre-copolymer to the melt index (MI) of the biodegradable aliphatic-aromatic polyester copolymer may be 5 or more, or 10 or more, or 10 to 50, or 10 to 25.

According to an embodiment, a ratio (Mw/$Mw_i$) of the weight average molecular weight (Mw) of the biodegradable aliphatic-aromatic polyester copolymer to the weight average molecular weight ($Mw_i$) of the aliphatic-aromatic polyester pre-copolymer may be 1 or more, or 1.0 to 2.5, or 1.5 to 2.0.

According to an embodiment, a ratio (Mz/$Mz_i$) of a z-average molecular weight of the biodegradable aliphatic-aromatic polyester copolymer (Mz) to the z-average molecular weight aliphatic-aromatic polyester pre-copolymer (Mzi) may be 1 or more or 1.5 or more, or 1.5 to 3.5, or 1.5 to 2.5.

The present disclosure provides a biodegradable aliphatic-aromatic polyester copolymer which has a carboxyl end group (CEG) content of 15 mg KOH/g or less, a ratio (Mz/Mn) of a z-average molecular weight (Mz) to a number average molecular weight (Mn) of 3 to 15, and a melt index (MI) of 5 g/10 min or less as measured under conditions of a temperature of 190° C. and a load of 2.16 kg in accordance with ASTM D 1238. IN some embodiments, the biodegradable aliphatic-aromatic polyester copolymer may be prepared by the method of preparing a biodegradable aliphatic-aromatic polyester copolymer described above.

According to an embodiment, the biodegradable aliphatic-aromatic polyester copolymer may have a carboxyl end group (CEG) content of 15 mg KOH/g or less, or 14 mg KOH/g or less, or 13 mg KOH/g or less, or 12 mg KOH/g or less, and the lower limit is not largely limited, but may be 1 mg KOH/g or more. The biodegradable aliphatic-aromatic polyester copolymer prepared according to the preparation method of an embodiment may minimize an acid value increase or lower an acid value within a short time, and thus, may implement both high viscosity and excellent hydrolysis resistance.

According to an embodiment, the biodegradable aliphatic-aromatic polyester copolymer may have a melt index (MI) of 5 g/10 min or less, or 4 g/10 min or less, or 3 g/10 min or less, or 0.1 to 2.5 g/10 min, as measured under conditions of a temperature of 190° C. and a load of 2.16 kg in accordance with ASTM D 1238. The biodegradable aliphatic-aromatic polyester copolymer prepared according to the preparation method of an embodiment may represent high viscosity by significantly increasing the melt viscosity of a low-viscosity pre-copolymer within a short time.

According to an embodiment, the biodegradable aliphatic-aromatic polyester copolymer may have a number average molecular weight (Mn) of 10,000 g/mol to 200,000 g/mol, or 30,000 to 150,000 g/mol, or 45,000 to 100,000 g/mol.

According to an embodiment, the biodegradable aliphatic-aromatic polyester copolymer may have a weight average molecular weight (Mw) of 50,000 g/mol to 800,000 g/mol, or 100,000 to 500,000 g/mol, or 120,000 to 400,000 g/mol, or 120,000 g/mol to 250,000 g/mol.

According to an embodiment, the biodegradable aliphatic-aromatic polyester copolymer may have a z-average molecular weight (Mz) of 200,000 g/mol to 2,000,000 g/mol, or 200,000 to 1,500,000 g/mol, or 250,000 to 1,000,000 g/mol, or 250,000 to 900,000 g/mol, or 400,000 to 900,000 g/mol.

According to an embodiment, the biodegradable aliphatic-aromatic polyester copolymer may have a ratio (Mz/Mn) of the z-average molecular weight (Mz) to the number average molecular weight (Mn) of 3 or more, or 3 to 15 or 5 to 15, or 7 to 13.

According to an embodiment, the biodegradable aliphatic-aromatic polyester copolymer may have a ratio (Mz/Mw) of the z-average molecular weight (Mz) to the weight average molecular weight (Mw) of 2 to 10, or 2 to 7 or 3 to 7, or 3 to 5.

According to an embodiment, the aliphatic-aromatic polyester copolymer may have a polydispersity index (PDI, Mw/Mn) of 1.5 to 10, or 2 to 9, or 2.5 to 8, but is not limited thereto.

According to an embodiment, the aliphatic-aromatic polyester copolymer may have a glass transition temperature (Tg) of −70 to 50° C., or −50 to 0° C. and a melting temperature (Tm) of 80 to 200° C., or 10 to 150° C., but is not limited thereto.

According to an embodiment, the biodegradable aliphatic-aromatic polyester copolymer may be one or a combination of two or more selected from the group consisting of polybutylene adipate terephthalate (PBAT), polybutylene succinate butylene terephthalate (PBAST), polybutylene sebacate terephthalate (PBSeT), and/or the like, and mixtures thereof.

According to an embodiment, the biodegradable aliphatic-aromatic polyester copolymer has excellent processability and may be manufactured into a molded article according to a commonly used polymer molding method or known method such as extrusion molding, injection molding, and blow molding, and the molded article may be used for various uses requiring mechanical properties and hydrolysis resistance. The molded article may be, as an example, in various forms such as packaging containers, films, sheets, disposable bags, disposable household items, and packaging cushioning materials, but is not limited thereto.

Biodegradable aliphatic-aromatic polyester copolymer(s) of the present invention which are decomposed under certain conditions can replace non-biodegradable plastics to reduce waste and/or ameliorate the release of greenhouse gases into the environment by decomposition and/or incineration of packaging material. Biodegradable aliphatic-aromatic polyester copolymer(s) of the present invention may be useful for packaging in various forms as discussed above, including bio-packaging, and provides an enabling technology having a direct, potential or indirect contribution to greenhouse gas emissions mitigation and reducing the release of greenhouse gases, such as $CO_2$.

A method is provided herein for reducing greenhouse gas emissions by preparing a biodegradable aliphatic-aromatic polyester copolymer, the method comprising: (S1) adding an aliphatic-aromatic polyester pre-copolymer to a reactor;

(S2) adding a chain extender to the reactor to prepare a chain extended aliphatic-aromatic polyester pre-copolymer by a first polyaddition reaction of the aliphatic-aromatic polyester pre-copolymer and the chain extender; and (S3) adding an anti-hydrolysis agent to the reactor to perform a second reaction of the chain extended aliphatic-aromatic polyester pre-copolymer and the anti-hydrolysis agent to produce a biodegradable aliphatic-aromatic polyester copolymer.

Hereinafter, the present disclosure will be described in more detail with reference to the examples and the comparative examples. However, the following examples and the comparative examples are only an example for describing the present disclosure in more detail, and do not limit the present disclosure in any way.

The physical properties of the following examples and comparative examples were measured by the following methods.

[Method of Evaluating Physical Properties]

1. Molecular weight (Mw, Mn, and Mz) [g/mol]: A weight average molecular weight (Mw), a number average molecular weight (Mn), and a z-average molecular weight (Mz) were measured using GPC (Alliance HPLC, Waters). Tetrahydrofuran as a solvent and polystyrene (EasiCal Polystyrene, Pre-prepared Calibration Kits) as a standard were used, and the analysis was performed at an operating temperature of 35° C. and a flow rate of 1 mL/min. In addition, a polydispersity index (PDI) value was calculated from Mw and Mn, and specifically, Mn, Mw, and Mz are defined as follows:

$$M_n = \frac{\sum N_i M_i}{\sum N_i}$$

$$M_w = \frac{\sum N_i M_i^2}{\sum N_i M_i}$$

$$M_z = \frac{\sum N_i M_i^3}{\sum N_i M_i^2}$$

wherein $M_i$ is a molecular weight of a molecule, and $N_i$ is the number of molecules having a molecular weight of $M_i$.

Other specific conditions for measuring a molecular weight are as follows:
- Analytical instrument: a GPC system (model name: Agilent, 1260 Infinity II High-Temperature GPC System) in which two columns (model name: Agilent, PLGEL MIXED-C 7.5×300 mm, 5 μm) were connected, a GPC flow rate was set to 1 mL/min, and a refractive index detector was connected was used.
- Sample preparation: 1.5 mg of a sample and 1 ml of tetrahydrofuran were added to a vial, and stirring was performed at room temperature for 1 hour or more by a shaking mixer for dissolving. 100 μL of the thus-prepared solution was injected into the GPC.

2. Melt Index (MI) [g/10 Min]

The melt index was measured under conditions of a temperature of 190° C. and a load of 2.16 kg in accordance with ASTM D 1238.

3. Acid Value [Mg KOH/g]

The acid value (carboxyl end group (CEG) content) of the biodegradable aliphatic-aromatic polyester copolymer was measured, and a lower value was evaluated as better hydrolysis resistance.

The acid value was measured in accordance with ASTM D664. The measurement equipment was Mettler Toledo T50—(Automatic Titrator) available from Mettler Toledo, and the measurement was performed by the following method. Measurement method: To a 100 ml beaker, 56 ml of chloroform and 24 ml of IPA were added, and a 0.1 N KOH solution was used to confirm a blank volume ($V_{Blank}$). In a 100 ml beaker, 56 ml of chloroform and 1 g of the biodegradable aliphatic-aromatic polyester copolymer were dissolved, 24 ml of IPA was added, stirring was performed, and 0.1 N KOH solution (concentration: 0.1 mol/L) was used to perform titration until an end point was sensed. The volume of the KOH solution ($V_{EP}$) used in titration was recorded, and the acid value was calculated using the following calculation formula:

$$\text{Acid Value} = \frac{(V_{EP} - V_{Blank}) \times c_{KOH} \times f \times M_{KOH}}{m_s} \quad \text{[Calculation Formula]}$$

$V_{EP}$=volume (ml) of KOH solution used for titration
$V_{Blank}$=blank volume (ml)
$C_{KOH}$=concentration of KOH solution used (mol/L)
f=Correction factor (titer)
$M_{KOH}$=KOH molecular weight (56.106 g/mol)
$m_s$=weight of biodegradable aliphatic-aromatic polyester copolymer (g)

Example 1

Polybutylene adipate terephthalate (hereinafter, pre-PBAT) was added to a reactor. Selected physical properties of pre-PBAT are shown in Table 1 below. The inside of the reactor was heated up to 230° C., 0.4 parts by weight of hexamethylene 1,6-diisocyanate (HDI) as a chain extender with respect to 100 parts by weight of PBAT was added, and the first polyaddition reaction was performed in a temperature condition of 230° C. (first reaction temperature) for 5 minutes. Subsequently, 0.2 parts by weight of polycarbodiimide (HMV-15CA) as an anti-hydrolysis agent was added to the reactor, and the second reaction was performed in a temperature condition of 250° C. (second reaction temperature) for 15 minutes (second reaction time). The temperature was slowly lowered, and the polyester was pelletized using an underwater pelletizer and dried, thereby finally obtaining a biodegradable aliphatic-aromatic polyester copolymer. The physical properties of the obtained biodegradable aliphatic-aromatic polyester copolymer were measured according to the method described above, and the results are shown in the following Table 2. In addition, DSC was used to measure the glass transition temperature (Tg) of the biodegradable aliphatic-aromatic polyester copolymer of Example 1 as −28.8° C. and the melting temperature (Tm) thereof as 122.6° C.

Example 2

The process was performed in the same manner as in Example 1, except that 0.4 parts by weight of the anti-hydrolysis agent was added.

Example 3

The process was performed in the same manner as in Example 1, except that the first reaction and the second reaction were performed for 10 minutes as the first reaction time and for 10 minutes as the second reaction time.

Example 4

The process was performed in the same manner as in Example 1, except that the first reaction and the second reaction were performed for 15 minutes as the first reaction time and for 5 minutes as the second reaction time.

Comparative Example 1

The process was performed in the same manner as in Example 1, except that the anti-hydrolysis agent was added simultaneously with the chain extender and the reaction was performed for 20 minutes, and the second reaction was not performed.

Comparative Example 2

The process was performed in the same manner as in Example 1, except that the anti-hydrolysis agent was not added.

Comparative Example 3

The process was performed in the same manner as in Example 1, except that the chain extender was not added.

TABLE 1

|  | Pre-PBAT |
|---|---|
| $Mn_i$ (g/mol) | 40,000 |
| $Mw_i$ (g/mol) | 90,000 |
| $Mz_i$ (g/mol) | 250,000 |
| $PDI_i$ (Mw/Mn) | 2.25 |
| Mz/Mn | 6.3 |
| Mz/Mw | 2.8 |
| $MI_i$ (g/10 min.) | 25 |
| CEG (mg KOH/g) | 12.5 |

TABLE 2

|  | Example 1 | Example 2 | Example 3 | Example 4 | Comparative Example 1 | Comparative Example 2 | Comparative Example 3 |
|---|---|---|---|---|---|---|---|
| Mn (g/mol) | 51,200 | 52,800 | 51,800 | 52,400 | 49,500 | 48,200 | 41,800 |
| Mw (g/mol) | 150,300 | 172,100 | 142,900 | 135,500 | 232,400 | 122,500 | 112,800 |
| Mz (g/mol) | 579,000 | 775,700 | 494,900 | 410,800 | 938,200 | 309,600 | 351,500 |
| PDI (Mw/Mn) | 2.94 | 3.26 | 2.76 | 2.59 | 4.69 | 2.54 | 2.70 |
| Mz/Mn | 11.3 | 14.7 | 9.6 | 7.8 | 19.0 | 6.4 | 8.4 |
| Mz/Mw | 3.9 | 4.5 | 3.5 | 3.0 | 4.0 | 2.5 | 3.1 |
| $Mn/Mn_i$ | 1.3 | 1.3 | 1.3 | 1.3 | 1.2 | 1.2 | 1.0 |
| $Mw/Mw_i$ | 1.7 | 1.9 | 1.6 | 1.5 | 2.6 | 1.4 | 1.3 |
| $Mz/Mz_i$ | 2.3 | 3.1 | 2.0 | 1.6 | 3.8 | 1.2 | 1.4 |
| MI (g/10 min) | 1.9 | 1.4 | 2.1 | 2.3 | 1.1 | 6.0 | 21.5 |
| $MI_i/MI$ | 13.2 | 17.9 | 11.9 | 10.9 | 22.7 | 4.2 | 1.2 |
| CEG (mg KOH/g) | 12.3 | 13.1 | 11.0 | 10.8 | 15.9 | 18.3 | 7.3 |

As seen in Table 2, it was confirmed that when in Example 1, the chain extender was added and then the anti-hydrolysis agent was added over time, a lower acid value was shown as compared with Comparative Example 1 in which the chain extender and the anti-hydrolysis agent were added simultaneously. In addition, upon comparison of Examples 1 and 3, the biodegradable aliphatic-aromatic polyester copolymer prepared with the second reaction time shorter than the first reaction time showed a lower melt index and a lower acid value.

A condensation reaction process time in the conventional polyester preparation was shortened by the method of preparing a biodegradable aliphatic-aromatic polyester copolymer according to an embodiment, and thus, problems of high acid value and high viscosity were solved. In addition, since a biodegradable aliphatic-aromatic polyester copolymer having a low melt index and a low acid value was prepared from a low-viscosity pre-copolymer within a short time, it was confirmed that the effects of both a significant viscosity rise and improvement of hydrolysis resistance desired in the present disclosure may be implemented simultaneously.

The present disclosure relates to a biodegradable aliphatic-aromatic polyester copolymer having excellent hydrolysis resistance and high viscosity and a method of preparing the same, and according to an exemplary embodiment, the biodegradable aliphatic-aromatic polyester copolymer prepared by adding a chain extender and an anti-hydrolysis agent over time may implement effects of both a significant viscosity rise and improvement of hydrolysis resistance. Thus, a condensation reaction time at a high temperature which was conventionally problematic may be significantly reduced to easily reach target acid value and viscosity.

Hereinabove, although the present disclosure has been described by specific matters and limited exemplary embodiments, they have been provided only for assisting in the entire understanding of the present disclosure, and the present disclosure is not limited to the exemplary embodiments. Various modifications and changes may be made by those skilled in the art to which the present disclosure pertains from this description.

Therefore, the spirit of the present disclosure should not be limited to the above-described exemplary embodiments, and the following claims as well as all modified equally or equivalently to the claims are intended to fall within the scope and spirit of the disclosure.

What is claimed is:

1. A method of preparing a biodegradable aliphatic-aromatic polyester copolymer, the method comprising:
   (S1) adding an aliphatic-aromatic polyester pre-copolymer to a reactor;
   (S2) adding a chain extender to the reactor comprising the aliphatic-aromatic polyester pre-copolymer to prepare a chain extended aliphatic-aromatic polyester pre-copolymer by a first polyaddition reaction of the aliphatic-aromatic polyester pre-copolymer and the chain extender; and (S3) adding an anti-hydrolysis agent to the reactor comprising the chain extended aliphatic-aromatic polyester pre-copolymer to prepare the biodegradable aliphatic-aromatic polyester copolymer by a second reaction of the chain extended aliphatic-aromatic polyester pre-copolymer and the anti-hydrolysis agent.

2. The method of preparing a biodegradable aliphatic-aromatic polyester copolymer of claim 1, wherein the first reaction of step (S2) is performed at 150 to 250° C.

3. The method of preparing a biodegradable aliphatic-aromatic polyester copolymer of claim 1, wherein the first reaction of step (S2) is performed for 10 to 30 minutes.

4. The method of preparing a biodegradable aliphatic-aromatic polyester copolymer of claim 1, wherein the second reaction of step (S3) is performed at 180 to 280° C.

5. The method of preparing a biodegradable aliphatic-aromatic polyester copolymer of claim 1, wherein the second reaction of step (S3) is performed for 2 to 15 minutes.

6. The method of preparing a biodegradable aliphatic-aromatic polyester copolymer of claim 1, wherein a ratio of the second reaction time of step (S3) to the first reaction time of step (S2) satisfies 0.1 to 0.5.

7. The method of preparing a biodegradable aliphatic-aromatic polyester copolymer of claim 1, wherein the chain extender comprises a diisocyanate compound.

8. The method of preparing a biodegradable aliphatic-aromatic polyester copolymer of claim 1, wherein the chain extender is comprised at 0.1 to 1 part by weight with respect to 100 parts by weight of the aliphatic-aromatic polyester pre-copolymer.

9. The method of preparing a biodegradable aliphatic-aromatic polyester copolymer of claim 1, wherein the anti-hydrolysis agent comprises a carbodiimide compound.

10. The method of preparing a biodegradable aliphatic-aromatic polyester copolymer of claim 1, wherein the anti-hydrolysis agent is comprised at 0.01 to 0.5 parts by weight with respect to 100 parts by weight of the aliphatic-aromatic polyester pre-copolymer.

11. The method of preparing a biodegradable aliphatic-aromatic polyester copolymer of claim 1, wherein a weight ratio of the anti-hydrolysis agent to the chain extender satisfies 0.1 to 1.

12. The method of preparing a biodegradable aliphatic-aromatic polyester copolymer of claim 1, wherein the aliphatic-aromatic polyester pre-copolymer has a melt index (MI) of 20 g/10 min or more as measured under conditions of a temperature of 190° C. and a load of 2.16 kg in accordance with ASTM D 1238.

13. The method of preparing a biodegradable aliphatic-aromatic polyester copolymer of claim 1, wherein a ratio $(Mz/Mz_i)$ of a z-average molecular weight of the biodegradable aliphatic-aromatic polyester copolymer (Mz) to the z-average molecular weight aliphatic-aromatic polyester pre-copolymer (Mzi) is 1.5 to 3.5.

14. A biodegradable aliphatic-aromatic polyester copolymer which has a carboxyl end group (CEG) content of 15 mg KOH/g or less, a ratio (Mz/Mn) of a z-average molecular weight (Mz) to a number average molecular weight (Mn) of 3 to 15, and a melt index (MI) of 5 g/10 min or less as measured under conditions of a temperature of 190° C. and a load of 2.16 kg in accordance with ASTM D 1238.

15. The biodegradable aliphatic-aromatic polyester copolymer of claim 14, wherein the biodegradable aliphatic-aromatic polyester copolymer has a weight average molecular weight (Mw) of 120,000 g/mol to 250,000 g/mol.

16. The biodegradable aliphatic-aromatic polyester copolymer of claim 15, wherein the biodegradable aliphatic-aromatic polyester copolymer has the z-average molecular weight (Mz) of 250,000 g/mol to 900,000 g/mol.

17. The biodegradable aliphatic-aromatic polyester copolymer of claim 14, wherein the biodegradable aliphatic-aromatic polyester copolymer has a ratio (Mz/Mw) of the z-average molecular weight (Mz) to the weight average molecular weight (Mw) of 2 to 7.

18. The biodegradable aliphatic-aromatic polyester copolymer of claim 14, wherein the biodegradable aliphatic-aromatic polyester copolymer is one or a combination of two or more selected from the group consisting of polybutylene adipate terephthalate (PBAT), polybutylene succinate butylene terephthalate (PBAST), polybutylene sebacate terephthalate (PBSeT) and mixtures thereof.

19. A method for reducing greenhouse gas emissions by preparing a biodegradable aliphatic-aromatic polyester copolymer, the method comprising:
(S1) adding an aliphatic-aromatic polyester pre-copolymer to a reactor;
(S2) adding a chain extender to the reactor comprising the aliphatic-aromatic polyester pre-copolymer to prepare a chain extended aliphatic-aromatic polyester pre-copolymer by a first polyaddition reaction of the aliphatic-aromatic polyester pre-copolymer and the chain extender; and
(S3) adding an anti-hydrolysis agent to the reactor comprising the chain extended aliphatic-aromatic polyester pre-copolymer to prepare the biodegradable aliphatic-aromatic polyester copolymer by a second reaction of the chain extended aliphatic-aromatic polyester pre-copolymer and the anti-hydrolysis agent.

* * * * *

UNITED STATES PATENT AND TRADEMARK OFFICE
CERTIFICATE OF CORRECTION

| | | |
|---|---|---|
| PATENT NO. | : 11,987,667 B1 | Page 1 of 1 |
| APPLICATION NO. | : 18/448370 | |
| DATED | : May 21, 2024 | |
| INVENTOR(S) | : Do Young Kim et al. | |

It is certified that error appears in the above-identified patent and that said Letters Patent is hereby corrected as shown below:

On the Title Page

Column 1, Item (73) Assignees, Line 2, delete "(KR)" and insert -- (KR); Kolon Industries, Inc., Seoul (KR) --

Signed and Sealed this
Fourth Day of February, 2025

Coke Morgan Stewart
*Acting Director of the United States Patent and Trademark Office*